United States Patent [19]
Zweegers

[11] 3,720,053
[45] March 13, 1973

[54] AGRICULTURAL IMPLEMENT FOR WORKING CROP LYING ON THE FIELD

[76] Inventor: Petrus Wilhelmus Zweegers, Nieuwendijk 46, Geldrop, Netherlands

[22] Filed: Jan. 11, 1971

[21] Appl. No.: 105,274

[30] Foreign Application Priority Data

Jan. 14, 1970 Netherlands ...................... 7000493

[52] U.S. Cl. .................................................. 56/370
[51] Int. Cl. ............................................. A01d 79/00
[58] Field of Search ................. 56/370, 376, 377, 400

[56] References Cited

UNITED STATES PATENTS 3,527,040  9/1970  Teagle ................................... 56/370

FOREIGN PATENTS OR APPLICATIONS 1,929,104  12/1970  Germany ............................... 56/370
1,262,955  12/1961  France ................................... 56/400
1,308,433  1/1961   France ................................... 56/400

Primary Examiner—Louis G. Mancene
Assistant Examiner—J. A. Oliff
Attorney—Edmund M. Jaskiewicz

[57] ABSTRACT

An agricultural rotary rake implement for working crop lying on the field. The implement comprises a movable frame which carries at least one rotary element for rotation in a substantially horizontal, slightly forwardly inclined plane. Each rotary element carries a circular array of substantially radially protruding resilient tines. A tine which is restrained in its rotary movement, is upwardly guided with respect to its mounting by means of a guide surface such as an inclined cam fixed on the rotary element, or by means of an inclination of the pivot pin of the tine with respect to the tangential direction of the rotary element, or by means of an inwardly yielding mounting of the tine.

11 Claims, 6 Drawing Figures

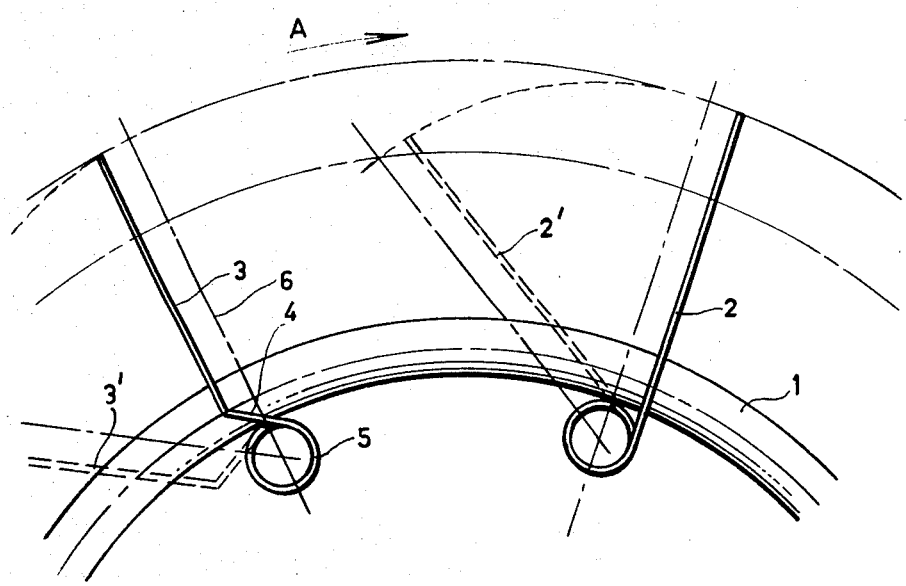
FIG: 1.

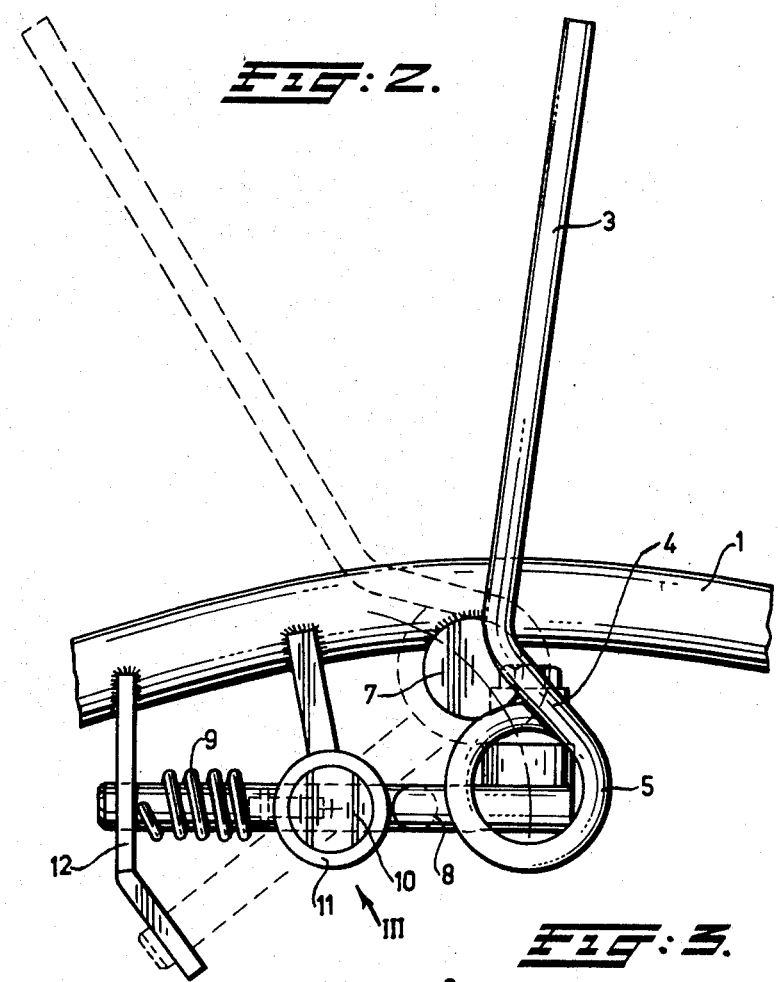
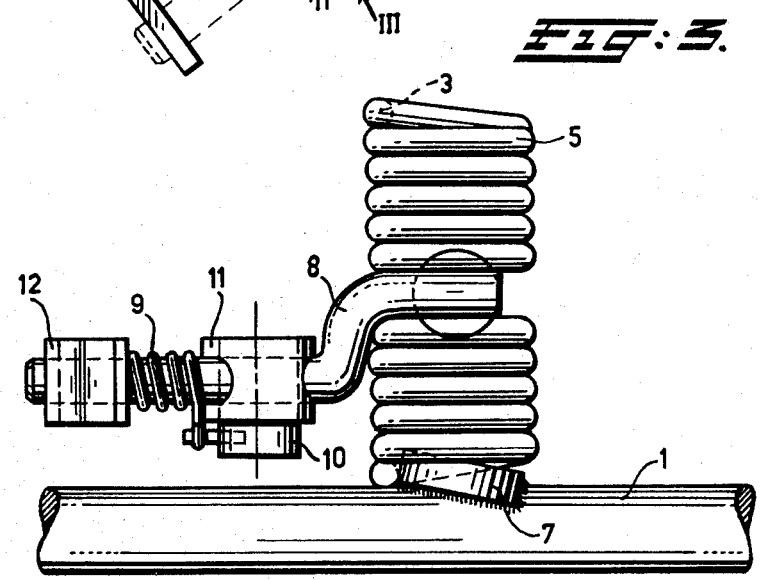

AGRICULTURAL IMPLEMENT FOR WORKING CROP LYING ON THE FIELD

My invention relates to an agricultural rotary rake implement for working crop lying on the field, comprising a movable frame which carries at least one rotary element for rotation in a substantially horizontal, slightly forwardly inclined plane, said rotary element carrying a circular array of substantially radially protruding resilient tines.

A problem in this type of implement is that during operation the tines move in a combined rotation and translation in the plane which is slightly tilted towards the ground at the front of the implement, so that the tines tend to dig into the ground and sometimes break. The digging of the tines into the ground causes the crop to be strongly mixed with dirt and on the other hand damages the grass mat of the field. Even the use of tines with a helically coiled inner end which enables a substantial angular movement of the protruding part of the tines with respect to their mounting, is not sufficient to solve this problem.

According to the invention, the abovementioned problem is solved in that means are provided for upwardly guiding the protruding part of a tine with respect to its mounting, when the tine is restrained in its rotary movement.

In a preferred embodiment said means take the shape of a guide surface along which the tine can move upwardly.

Thus, a tine which is restrained in its rotary movement obtains an upward movement which tilts the tine away from the ground.

In a simple suitable embodiment, the rotary element is provided with an inclined lug positioned near each tine so as to guide upwardly a protruding tine part which is tangentially moved against the resilient biasing force.

According to another proposal of the same applicant, the tines are connected to the rotary element by pivot pins extending in a radial plane of the rotary element and substantially normal to the radius through the mounting means of the tine. This pivot pin is loaded by a spring for upwardly pivoting the tine when the rotary element is stationary, whereas rotation of the rotary element causes downward pivoting of the tines by the centrifugal force, so that in operation the centrifugal force presses the tines against and possibly into the ground so that they may break.

In such an implement, in which each tine is connected to the rotary element via a pivot pin, the upward guiding of the tines may according to the invention be obtained by positioning the pivot pin with respect to the direction of rotation of the rotary element at such a rearward and downward inclination that the axis of the pin intersects or closely bypasses the circle described by the outer tip of the tines. When in this embodiment the tine contacts the ground during rotation, the tangential friction force has a component which tends to rotate the tine upwardly about its pivot axis against the centrifugal force. When the pivot pin is positioned as just indicated, the remaining ground pressure is very slight.

This embodiment can be further improved by arranging the pivot axis so as to be inclined also rearwardly and outwardly with respect to the direction of rotation of the rotary element. Thus, the substantially radially directed tine makes an acute angle with the pivot axis which promotes the upward pivoting by a tangential pressure and which allows a slight forward inclination of the tine with respect to the direction of rotation, which inclination improves the working of the crop lying on the field.

According to another embodiment, the tine is mounted at an end of a two-armed lever, an intermediate part of which is connected to the rotary element by a pivot pin extending transversely to the plane of rotation of the rotary element, whereas the other arm of the lever serves as counter weight. When a tangential pressure is exerted on the tine, the two-armed lever rotates against the centrifugal force, so that a certain angular movement of the tine is possible without increase of the spring tension. An intermediate part of the tine may be supported, so that the tine is upwardly guided when it swings inwardly. The tine may be connected to the two-armed lever by a pivot pin and the protruding tine part may extend over a fixed part of the rotary element.

For a tine with a helically coiled inner end, the upward guiding of the tine during angular movement in the plane of rotation can also be improved in that the protruding tine part comprises a first portion extending tangentially from the helically coiled part and obliquely rearwardly with respect to the direction of rotation, to the other side of a radius line through the mounting, and a contiguous second portion which is substantially radially outwardly directed. In comparison with a tine, the protruding part of which extends from the coiled part in a rectilinear radially outward direction, the just mentioned bent tine moves substantially farther inwardly for the same angular movement with respect to the mounting, or vice versa, the bent tine needs a smaller angular movement for the same amount of inward movement.

The invention will now be further elucidated with reference to the accompanying drawings.

FIG. 1 is a schematic plan view of a known tine and of a tine according to one embodiment of the invention, in which the resilient movement of these tines during operation is shown.

FIG. 2 is a plan view of a tine mounted according to an other proposal and cooperating with a cam according to an embodiment of the invention.

FIG. 3 is a rear view of the tine and surrounding parts according to FIG. 2.

Figure 4:
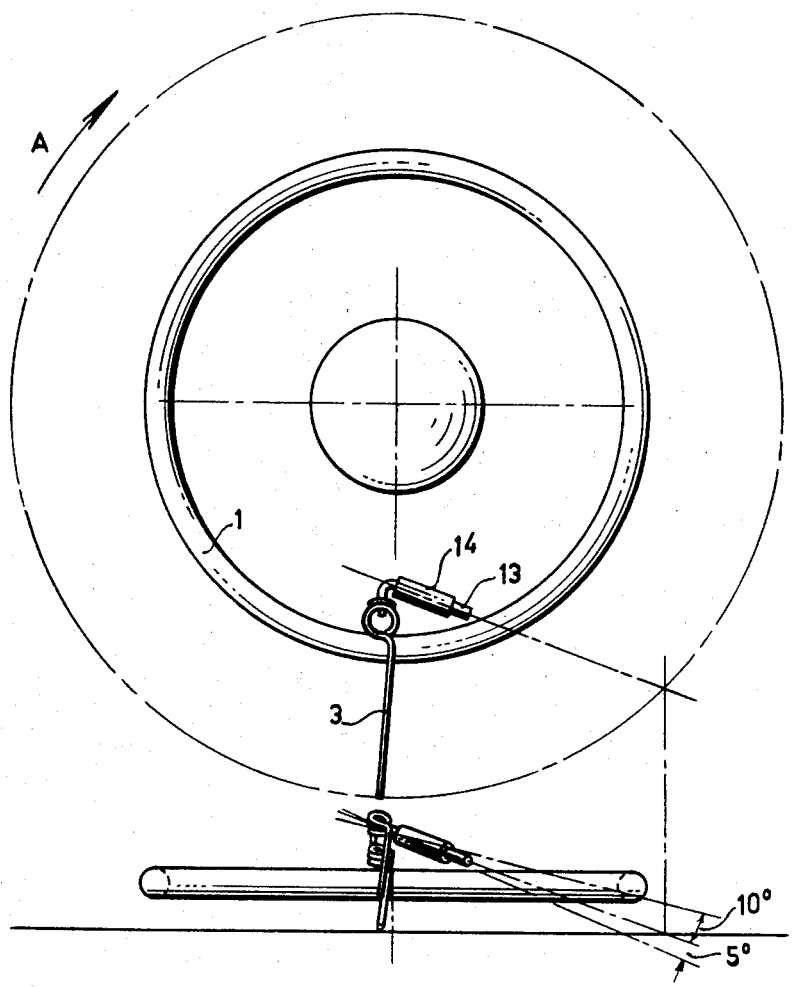
FIG. 4 is a schematic plan view and front view of another embodiment of the invention incorporating an inclined pivot pie.

The agricultural implement according to the invention is of the general construction described in U.S. Pat. application Ser. No. 42,774 issued as U.S. Pat. No. 3,611,690 on Oct. 12, 1971 and which comprises preferably two adjacent counter rotating elements mounted on a frame carried by ground wheels and towed behind a tractor, the rotary element being driven from the power take off shaft of the tractor. The two rotary elements rotate in a plane which is nearly horizontal, that is it intersects the ground at a small angle at the front side of the implement FIG. 1 shows only the circular mounting tube 1 of one rotary element. This tube 1 carries a regularly circumferentially spaced series of substantially radially protruding tines 2, which as known usually comprise a length of spring steel wire, the inner end of which is helically wound into a coil. The end of the coil is fastened to the tube 1. When the implement is moved over the field, the rotary element 1 rotates in the direction shown by the arrow A, while simultaneously performing a translational movement at a small angle to the plane of rotation. Thus, at the front of the implement the tines contact the crop on the field, such as hay, usually over a sector of the rotational movement which is smaller than 90°, the tines engage the crop and throw it rearwardly according a path passing between the two rotary elements. Generally the tines also contact the ground. When moving through the operational sector of their rotation, the tines perform also a large angular movement with respect to their mounting, since their engagement with the crop and with the ground meets with a substantial resistance. In FIG. 1, the angularly displaced position of a tine 2 under the influence of such a resistance load is shown by broken lines 2'.

According to one embodiment of the invention, the known straight tine 2 is replaced by a tine 3, the protruding part of which comprises a first portion 4, which is tangentially outwardly directed from the coil 5 and is also rearwardly inclined with respect to the direction of rotation of the element 1 and which continues to the other side of the radius 6 intersecting the mounting center of the coil 5. Via a sharp bend, this portion then merges with an outer operative tine portion which is substantially radially outwardly directed. The position of this tine corresponding to the same angular displacement as the position 2' for the tine 2 is shown by broken lines 3'. It appears clearly from FIG. 1, that the tine 3 in the position 3' moves much further inward than the tine 2 in the position 2'. Thus, if the other operational conditions such as operational sector of the rotational movement, translational movement and forces on the outer tip of the tines are equal, the tine 3 will be more favorably loaded than the tine 2. Also, it is much easier to obtain an upward movement, f.i. by contact with the tube 1, for the tine 3 then for the tine 2, so that the centrifugal force pressing the tine against the ground is overcome by the lifting of the tine.

According to FIGS. 2 and 3, the upward movement of the tine 3 when performing the angular displacement is obtained by an inclined cam 7 welded to the inner side of the tube 1 at such a location that the portion 4 of the tine 3 slides upwardly over said cam when the tine performs its resilient rearward angular movement. Such a cam may also be used for the known tine 2 shown in FIG. 1, but it is more suitable for the tine 3. The tine mounting according to FIGS. 2 and 3 is of a type described in an other proposal of the same applicant, according to which the end of the coil is fixed to a pin 8 which is rotatable in a vertical spindle 10 against the load of a spring 9, whereas the vertical spindle 10 itself is rotatable in a lug 11, welded to the tube 1. The pin 8 can be inserted in two different angular positions in two holes of a strip 12 welded to the tube 1. In both positions of the pin 8, the tine 3 can be pivoted upwardly by the spring 9 to a vertical position, but in operation the centrifugal force acts on the tine so as to hold it outwardly and somewhat downwardly inclined. In the position of the pin 8 shown in FIG. 2 by full lines, the portion 4 of the tine 3 is held against or at least just over the inclined cam 7 during operation and in unloaded position of the tine. When the tine 3 is loaded in circumferential direction by contact with the ground, the portion 4 of the tine 3 slides upwardly along the cam 7 so that the tip of the tine 3 is lifted clear from the ground or at least is not pressed against the ground by the centrifugal force.

In the position of the pin 8 shown in FIG. 2 by broken lines, the upward movement of the tines 3 when being angularly displaced is obtained in that its portion 4 slides upwardly against the tube 1. In this position, the cam 7 is located within the coil 5 and is thus out of operation. It will be appreciated that the cam 7 is only shown as exemplary embodiment and the positive upward guiding of tines of many shapes can be obtained by means of for instance inclined cams of many suitable shapes mounted on the rotary element. However, the embodiment shown in FIGS. 2 and 3 has the advantage that the cam 7 in the position in which the tube itself can serve as a guiding surface, is out of the way within the coil, whereas in the other position of the pin 8, in which the tube itself is not a sufficient upward guide, the cam becomes operative.

FIG. 4 shows an other possibility of obtaining the upward movement of the tine when being rearwardly displaced, in which the tines 3 are mounted to a pivot pin 13. According to FIG. 4, the tine 3 is mounted to a pivot pin 13 extending in a bushing 14 connected to the circular support tube 1. The direction of the pivot pin 13 is so chosen that its axis intersects the circle described by the tips of the tine 3 during rotation. When, as shown in FIG. 4, the tines 3 have two outwardly projecting teeth, the axis of the pin 13 should intersect the circle described by the lower teeth of the tines. By the inclined position of the pin 13, the load on the tine tip because of its movement over the ground tends to rock the tine upwardly about the pivot pin against the centrifugal force. It has been found that this effect remains present in a sufficient degree when the axis of the pivot pin 13 does not actually intersect the circle described by the tips of the lower teeth of the tines, but shows an upward deviation of 10° or a downward deviation of 5° from the intersection line, as shown in FIG. 4. According to FIG. 4, the pin 13 is also rearwardly and outwardly inclined with respect to the direction of rotation of the rotary element as shown by the arrow A in FIG. 4. The longitudinal direction of the tine 3 is inclined at an acute angle with respect to the pivot pin 13, such that the tine 3 is substantially radially outwardly directed or rather somewhat forwardly inclined with respect to a radius. This promotes on the one hand the upward movement of the tines when loaded in circumferential direction and on the other hand it is the most favorable position for working the crop on the field.

Figure 5:
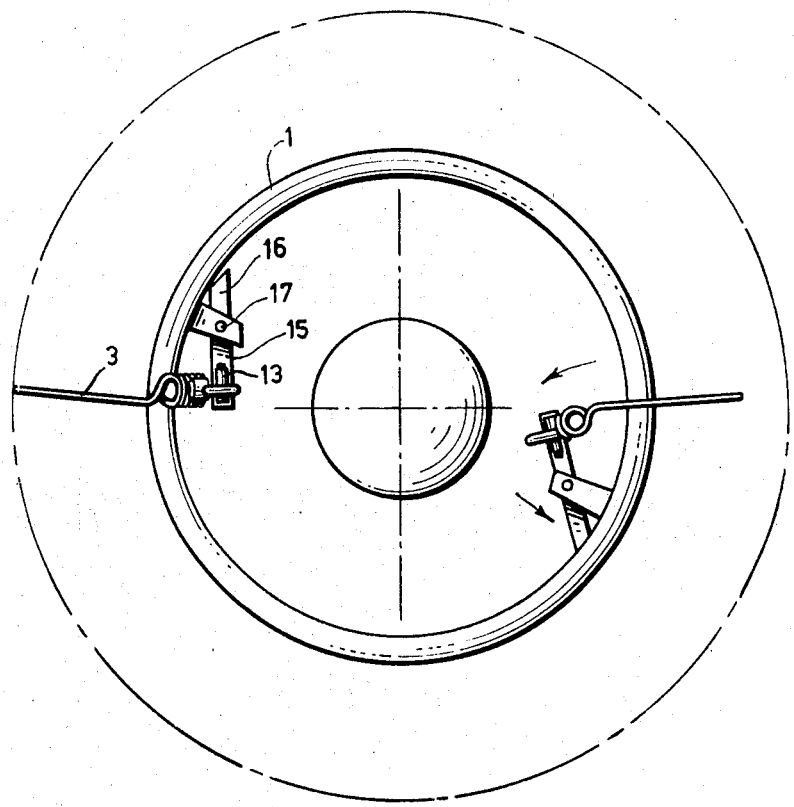
FIG. 5 is a plan view of an embodiment in which the tine is mounted on a two-armed lever.
Figure 6:
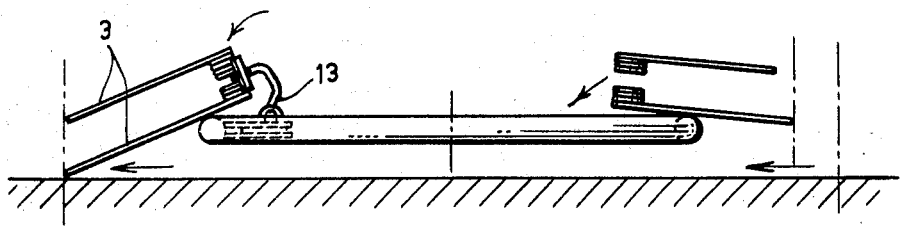
FIG. 6 is a side view of the embodiment of FIG. 5.

According to FIGS. 5 and 6, the tines 3 (which in this embodiment also have double teeth) are also fixed to a pivot pin 13, but this pin is not directly connected to the support tube 1, but it is mounted at one end of a two-armed lever 15, an intermediate point of which is connected to the tube 1 by a substantially vertical pivot pin 17, whereas the other arm 16 of the lever serves as an abutment for limiting the inward movement of the tine. The left part of FIG. 5 shows the operating position of the tine 3 and the right part of FIG. 5 shows the position of the tine 3 when loaded in circumferential direction. By the load on the tines 3 in circumferential direction, the two-armed lever 15, 16 is rocked against the centrifugal force until the arm 16 abuts against the tube 1. The so obtained substantially radially directed inward movement of the pivot pin 13 causes the tines 3 to slide over the tube 1 and thus to be rocked upwardly, see FIG. 6. When the circumferential load on the tine 3 ends, the centrifugal force moves the tine again to its operating position shown in the left part of FIGS. 5 and 6.

What I claim is:

1. An agricultural rotary rake implement for working crop material lying on a field or ground comprising a frame movable over the field, at least one rotary element mounted on said frame for rotation about a substantially vertically extending, slightly forwardly and rearwardly inclined axis in a substantially horizontal, slightly forwardly inclined plane and tilted towards the ground at the front of the implement, a plurality of circumferentially arranged resilient tines mounted on said rotary element, each of said tines extending radially from said rotary element and initially contacting the crop on the ground at the front of the implement during rotation of said rotary element, and means disposed on said rotary element for guiding and forcing the protuding portion of each of said tines upwardly with respect to its mounting on said rotary element when the tine is restrained in its rotary movement.

2. An agricultural implement according to claim 1, wherein said means comprise a guide surface along which the tine can move.

3. An agricultural implement according to claim 2, wherein said guide surface comprises an inclined cam secured to the rotary element and engageable by the protruding tine portion when it is angularly displaced so that said tine portion slides upwardly along said cam.

4. An agricultural implement according to claim 12 wherein a pivot pin connects each tine to the rotary element, said pivot pin being rearwardly and downwardly inclined with respect to the direction of rotation of the rotary element, such that it intersects the circle described by the tip of the tine or passes said circle at a smaller distance respectively.

5. An agricultural implement according to claim 4, wherein the pivot pin is also rearwardly and outwardly inclined with respect to the direction of rotation of the rotary element.

6. An agricultural implement according to claim 1, wherein each tine is mounted on an end of a two-armed lever, an intermediate part of said two-armed lever being connected to the rotary element by a pivot pin extending transversely to the direction of rotation of the rotary element, the other arm of said lever serving as abutment.

7. An agricultural implement according to claim 6, wherein an intermediate part of the tine rests on a support so that it is rocked upwardly when retracted inwardly.

8. An agricultural implement according to claim 7, in which the tine is connected to the two-armed lever via a pivot pin, wherein the protruding tine portion extends over a rigid part of the rotary element.

9. An agricultural implement according to claim 1 wherein the inner end of the tine is helically wound such that the protruding tine part comprises a first portion extending tangentially from the coiled tine part in rearwardly inclined direction with respect to the direction of rotation of the rotary element toward a position at the other side of a radius through the mounting center of the tine and further a second, substantially radially outwardly directed portion.

10. An agricultural implement according to claim 4, wherein the axis of the pivot pin has an upward deviation of maximum 10° or a downward deviation of maximum 5° with respect to the intersection line with the circle described by the tine tips.

11. An agricultural implement according to claim 3, in which the tine is connected to the rotary element by a pivot pin which is adjustable about an axis extending transversely to the pivot pin itself and transversely to the plane of rotation of the rotary element, wherein the protruding tine part rests operatively on the inclined cam in one of the positions of adjustment of the pivot pin, whereas the inclined cam is in an inoperative position in an other position of adjustment of the pivot pin.

* * * * *